United States Patent
Woulfe et al.

(10) Patent No.: US 10,585,780 B2
(45) Date of Patent: Mar. 10, 2020

(54) ENHANCING SOFTWARE DEVELOPMENT USING BUG DATA

(71) Applicant: MICROSOFT TECHNOLOGY LICENSING, LLC, Redmond, WA (US)

(72) Inventors: Muiris Woulfe, Dublin (IE); Poornima Muthukumar, Seattle, WA (US); Yuanyuan Dong, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/469,396

(22) Filed: Mar. 24, 2017

(65) Prior Publication Data
US 2018/0276103 A1    Sep. 27, 2018

(51) Int. Cl.
*G06F 11/36* (2006.01)
*G06F 8/75* (2018.01)
(Continued)

(52) U.S. Cl.
CPC .............. *G06F 11/362* (2013.01); *G06F 8/33* (2013.01); *G06F 8/71* (2013.01); *G06F 8/75* (2013.01); *G06F 11/36* (2013.01); *G06F 11/3604* (2013.01); *G06F 11/3608* (2013.01); *G06F 11/3624* (2013.01); *G06F 11/3668* (2013.01)

(58) Field of Classification Search
None
See application file for complete search history.

(56) References Cited

U.S. PATENT DOCUMENTS

| 7,672,811 B2 | 3/2010 | Xiao et al. |
| 8,190,468 B1 | 5/2012 | Drew et al. |
| (Continued) | | |

FOREIGN PATENT DOCUMENTS

| CN | 105446734 A | 3/2016 |
| WO | 2015065367 A1 | 5/2015 |

OTHER PUBLICATIONS

U.S. Appl. No. 15/362,744, Woulfe, et al., "Source Code Bug Prediction", filed Nov. 28, 2016.
(Continued)

*Primary Examiner* — Francisco J Aponte
*Assistant Examiner* — Mark A Gooray
(74) *Attorney, Agent, or Firm* — Rainier Patents, P.S.

(57) ABSTRACT

For each detected bug, historical code with similar characteristics and bug corrections from a historical bug dataset can be displayed in a source code editor. Relevant training and/or testing data can be found by comparing an internal representation of the code under development with an internal representation of the original buggy code in the historical bug dataset. Training and/or testing data that is relevant to the current code can be distinguished from irrelevant training and/or testing data by determining that the code syntax tokens from the current and historical data overlap to at least a specified percentage. Code can be devolved into a set of metrics. The degree of overlap between the metric sets can be determined. If a computed risk factor for the bug correction meets or exceeds a specified threshold, the bug correction can be automatically applied. Additional testing can be automatically performed on and/or added to the corrected code.

17 Claims, 10 Drawing Sheets

(51) Int. Cl.
  G06F 8/71 (2018.01)
  G06F 8/33 (2018.01)

(56) References Cited

U.S. PATENT DOCUMENTS

| | | | |
|---|---|---|---|
| 8,311,806 | B2 | 11/2012 | Bonnet et al. |
| 8,381,190 | B2 | 2/2013 | John et al. |
| 8,386,854 | B2 | 2/2013 | Fernandess et al. |
| 8,589,882 | B2 | 11/2013 | Shochat et al. |
| 8,750,489 | B2 | 6/2014 | Park |
| 8,850,272 | B2 | 9/2014 | Pasala et al. |
| 8,924,938 | B2 | 12/2014 | Chang et al. |
| 9,043,759 | B1 | 5/2015 | Lininger |
| 9,183,123 | B2 | 11/2015 | Spektor et al. |
| 9,201,646 | B2 | 12/2015 | Balachandran |
| 9,244,510 | B1 | 1/2016 | Conrad et al. |
| 9,256,513 | B2 | 2/2016 | Chen |
| 9,305,279 | B1 | 4/2016 | Menzel |
| 9,378,015 | B2 | 6/2016 | Nagappan et al. |
| 9,389,984 | B2 | 7/2016 | Chockler et al. |
| 9,471,470 | B2 | 10/2016 | Prasad et al. |
| 9,639,353 | B1 | 5/2017 | Henriksen et al. |
| 9,733,933 | B1 | 8/2017 | Arquero et al. |
| 9,898,387 | B2 * | 2/2018 | Rodmell ............ G06F 11/3664 |
| 10,175,979 | B1 | 1/2019 | Elwell et al. |
| 2003/0084063 | A1 | 5/2003 | Delmonaco et al. |
| 2004/0117761 | A1 | 6/2004 | Andrews et al. |
| 2006/0041864 | A1 | 2/2006 | Holloway et al. |
| 2006/0156286 | A1 * | 7/2006 | Morgan ................. G06F 8/51 717/124 |
| 2007/0028219 | A1 | 2/2007 | Miller et al. |
| 2008/0228549 | A1 | 9/2008 | Harrison |
| 2009/0182757 | A1 | 7/2009 | Lotlikar et al. |
| 2009/0319995 | A1 | 12/2009 | Gawor et al. |
| 2010/0058294 | A1 | 3/2010 | Best et al. |
| 2011/0154109 | A1 | 6/2011 | Levine et al. |
| 2011/0314450 | A1 | 12/2011 | Shochat et al. |
| 2012/0204068 | A1 | 8/2012 | Ye et al. |
| 2013/0007700 | A1 * | 1/2013 | Villar ................. G06F 8/33 717/109 |
| 2013/0014084 | A1 | 1/2013 | Sahibzada et al. |
| 2013/0311968 | A1 | 11/2013 | Sharma |
| 2014/0033174 | A1 | 1/2014 | Farchi et al. |
| 2014/0053135 | A1 | 2/2014 | Bird et al. |
| 2014/0079297 | A1 | 3/2014 | Tadayon et al. |
| 2014/0136277 | A1 | 5/2014 | Bassin et al. |
| 2014/0172514 | A1 | 6/2014 | Schumann et al. |
| 2015/0033202 | A1 * | 1/2015 | Wilson ................. G06F 8/43 717/106 |
| 2015/0058826 | A1 | 2/2015 | Hu et al. |
| 2015/0067861 | A1 | 3/2015 | Foley et al. |
| 2015/0082277 | A1 | 3/2015 | Champlin-Scharff et al. |
| 2015/0089481 | A1 | 3/2015 | Pasala et al. |
| 2015/0161030 | A1 | 6/2015 | Wu et al. |
| 2015/0269060 | A1 | 9/2015 | Rodmell |
| 2015/0363294 | A1 | 12/2015 | Carback et al. |
| 2016/0042275 | A1 | 2/2016 | Dettman et al. |
| 2016/0274994 | A1 * | 9/2016 | Nikam ............... G06F 11/3608 |
| 2016/0378618 | A1 | 12/2016 | Cmielowski et al. |
| 2017/0060578 | A1 | 3/2017 | Shukla et al. |
| 2017/0075790 | A1 | 3/2017 | Macleod et al. |
| 2017/0091078 | A1 | 3/2017 | Atyam et al. |
| 2017/0147955 | A1 | 5/2017 | Ezry et al. |

OTHER PUBLICATIONS

U.S. Appl. No. 15/469,414, Woulfe, et al., "Bug Categorization and Team Boundary Inference via Automated Bug Detection", filed Mar. 24, 2017.
U.S. Appl. No. 15/469,423, Woulfe, et al., "Improving Engineering System Robustness Using Bug Data", filed Mar. 24, 2017.
U.S. Appl. No. 15/469,431, Woulfe, et al., "Facilitating Organizational Management Using Bug Data", filed Mar. 24, 2017.
Maheedharan, Vimal, "Continuous Integration Testing Using Selenium", Published on: Dec. 28, 2016, 17 pages.
Bajwa, et al., "Unintentional bugs to vulnerability mapping in Android applications", In Proceedings of IEEE International Conference on Intelligence and Security Informatics, May 27, 2015, 2 pages.
Wang, et al., "Detect Related Bugs from Source Code Using Bug Information", In Proceedings of IEEE 34th Annual Computer Software and Applications Conference, Jul. 19, 2010, pp. 228-237.
"Non Final Office Action Issued in U.S. Appl. No. 15/469,431", dated Aug. 9, 2019, 22 Pages.
Dommati, et al., "Bug Classification: Feature Extraction and Comparison of Event Model using Naive Bayes Approach", In Proceedings of International Conference on Recent Trends in Computer and Information Engineering, Apr. 13, 2012, pp. 8-12.
"Definition of Risk Factor", Retrieved Date: Nov. 29, 2018, 10 Pages.
"Non Final Office Action Issued in U.S. Appl. No. 15/362,744", dated May 15, 2019, 24 Pages.
"Final Office Action Issued in U.S. Appl. No. 15/469,423", dated Oct. 5, 2018, 25 Pages.
"Non Final Office Action Issued in U.S. Appl. No. 15/469,423", dated Apr. 27, 2018, 24 Pages.
"Non Final Office Action Issued in U.S. Appl. No. 15/469,423", dated Mar. 22, 2019, 8 Pages.
"Final Office Action Issued in U.S. Appl. No. 15/469,431", dated Nov. 19, 2018, 24 Pages.
"Non Final Office Action Issued in U.S. Appl. No. 15/469,431", dated Apr. 9, 2018, 20 Pages.
Zhang, et al., "Mining Individual Performance Indicators in Collaborative Development Using Software Repositories", In Proceedings of 15th Asia-Pacific Software Engineering Conference, Dec. 3, 2008, pp. 247-254.
Cook, et al., "Finding Bugs in Source Code Using Commonly Available Development Metadata", In Proceedings of 8th Workshop on Cyber Security Experimentation and Test, Aug. 10, 2015, 8 Pages.
Gong, et al., "BugMap: A Topographic Map of Bugs", In Proceedings of the 9th Joint Meeting on Foundations of Software Engineering, Aug. 18, 2013, pp. 647-650.
Hardesty, Larry, "Recognizing Correct Code", Jan. 29, 2016, 3 Pages.
Khanduja, Jaideep, "How to Predict the Number of Bugs in the Next Code of a Programmer", Oct. 19, 2009, 6 Pages.
Kim, et al., "Classifying Software Changes: Clean or Buggy", In Journal IEEE Transactions on Software Engineering, vol. 34, Issue 2, Mar. 31, 2008, 41 Pages.
Kim, et al., "Memories of Bug Fixes", In Proceedings of the 14th ACM SIGSOFT International Symposium on Foundations of Software Engineering, Nov. 5, 2006, 11 Pages.
Lee, et al., "Micro Interaction Metrics for Defect Prediction", In Proceedings of the 19th ACM SIGSOFT Symposium and the 13th European Conference on Foundations of Software Engineering, Sep. 5, 2011, pp. 311-321.
Lewis, et al., "Bug Prediction at Google", Dec. 15, 2011, 15 Pages.
Madhavan, et al., "Predicting Buggy Changes Inside an Integrated Development Environment", In Proceedings of the OOPSLA Workshop on Eclipse Technology Exchange, Oct. 21, 2007, pp. 36-40.
Ostrand, et al., "Programmer-Based Fault Prediction", In Proceedings of the 6th International Conference on Predictive Models in Software Engineering, Sep. 12, 2010, 10 Pages.
"Probability vs Confidence", 2016, 4 Pages.
"Final Office Action Issued in U.S. Appl. No. 15/362,744", dated Oct. 17, 2019, 25 Pages.
"Non-Final Office Action Issued in U.S. Appl. No. 15/469,414", dated Nov. 15, 2019, 28 Pages.
"Final Office Action Issued in U.S. Appl. No. 15/469,423", dated Oct. 3, 2019, 30 Pages.
Annis, Charles, "Frequentists and Bayesians", 2014, 2 Pages.
Mani, et al., "AUSUM: Approach for Unsupervised Bug Report Summarization", In Proceedings of the ACM SIGSOFT 20th International Symposium on the Foundations of Software Engineering, Nov. 11, 2012, 11 Pages.

(56) References Cited

OTHER PUBLICATIONS

Meyniel, et al., "Confidence as Baysian Probability: from neural origins to behavior", In Neuron vol. 88, Issue 1, Oct. 7, 2015, pp. 78-92.

Strauss, et al., "Classical confidence intervals and Bayesian probability estimates for ends of local taxon ranges", Mathematical Geology, vol. 21, No. 4, May 1989, pp. 411-427.

* cited by examiner

122

| Internal Representation | Original Buggy Code | Corrected Code |
|---|---|---|
| LocalDeclarationStatement, VariableDeclaration, ArrayType, Predefined Type, IntKeyword, ArrayRankSpecifier, EOL  122a | public static int Fibonacci (int n) {                                 122d <br> int[ ] fib = new int[n];   122b <br> fib[0] = 0; <br> fib[1] = 1;              122e | int[ ] fib = new int[n + 1]; <br><br> 122c |
| ExpressionStatement, SimpleAssignmentExpression, ElementAccessExpression, IdentifierName, EOL | for (int i = 2; i <= n; i++) {   fib[i] = fib[i – 1]; } return fib[n]; | fib[i]= fib[i – 1] + fib[i – 2]; |

```
public static int Fibonacci (int n)
{
    int[ ] fib = new int[n];   123a
    fib[0] = 0;
    fib[1] = 1;
```
} 116

123b

Risk: 0%    123c

| Buggy | Corrected |
|---|---|
| public static int Fibonacci (int n)<br>{<br>    int[ ] fib = new int[n];    122b<br>    fib[0] = 0;<br>    fib[1] = 1; | 123e<br>int[ ] fib = new int[n + 1];<br>123d    122c |

EDITOR 109

Original Source Code File 302

```
1   public static class Fibonacci
2   {
3       public static int Fibonacci ( int n )
4       {
5           int [ ] fib = new int [n];
6           fib[0] = 0;
7           fib[1] = 1;
8           for (int i=2; i<= n; i++)
9           {
10              fib[i] = fib[i – 1];
11          }
12          return fib[n];
13      }
14  }
```

Modified Source Code File 304

```
1   public static class Fibonacci
2   {
3       public static int Fibonacci ( int n )
4       {
5           int [ ] fib = new int [n + 1];
6           fib[0] = 0;
7           fib[1] = 1;
8           for (int i=2; i<= n; i++)
9           {
10              fib[i] = fib[i – 1] + fib[i-2];
11          }
12          return fib[n];
13      }
14  }
```

Differential Code 306

```
    public static class Fibonacci
    {
        public static int Fibonacci ( int n )
        {
-           int[] fib = new int[n];
+           int [ ] fib = new int [n + 1];
            fib[0] = 0;
            fib[1] = 1;
            for (int i=2; i<= n; i++)
            {
-               fib[i] = fib[i-1];
+               fib[i] = fib[i – 1] + fib[i-2];
            }
            return fib[n];
        }
    }
```

Mined Data 308

```
FALSE    public static class Fibonacci
FALSE    {
FALSE        public static int Fibonacci ( int n )
TRUE         {
FALSE            int [ ] fib = new int [n];
FALSE            fib[0] = 0;
FALSE            fib[1] = 1;
FALSE            for (int i=2; i<= n; i++)
TRUE             {
FALSE                fib[i] = fib[i – 1];
FALSE            }
FALSE            return fib[n];
FALSE        }
FALSE    }
```

ENHANCING SOFTWARE DEVELOPMENT USING BUG DATA

CROSS-REFERENCE TO RELATED APPLICATIONS

The application is related in subject matter to co-pending U.S. patent application Ser. No. 15469414 entitled "BUG CATEGORIZATION AND TEAM BOUNDARY INFERENCE VIA AUTOMATED BUG DETECTION", filed on Mar. 24, 2017. The application is related in subject matter to co-pending U.S. patent application Ser. No. 15469423 entitled "IMPROVING ENGINEERING SYSTEM ROBUSTNESS USING BUG DATA", filed on Mar. 24, 2017. The application is related in subject matter to co-pending U.S. patent application Ser. No. 15469431 entitled "FACILITATING ORGANIZATIONAL MANAGEMENT USING BUG DATA", filed on Mar. 24, 2017. This application is related in subject matter to co-pending U.S. patent application Ser. No. 15/362744 entitled "SOURCE CODE BUG PREDICTION" filed on Nov. 28, 2016.

BACKGROUND

Software development involves the programming, testing, and bug correction needed to create a software product. Software development includes everything between conception of the product to the final result. Software development can be a slow, difficult and expensive process. Hence, anything that can be done to help developers produce high quality bug-free code quickly is very helpful. A bug is a mistake or error in coding that causes a program to behave in an unexpected way.

SUMMARY

A dataset of historical bug data can be constructed that can include historical data comprising the original buggy code (i.e., the code before the bug was corrected) and the corrected code (the bug fix). Training and/or testing data from a machine learning and/or statistical analysis system can be used to create the dataset. Training and/or testing data that is relevant to code under development can be distinguished from irrelevant training and/or testing data by determining that the code syntax tokens from the current and historical data overlap to at least a specified percentage. Code can be devolved into a set of metrics. The degree of overlap between the metric sets can be determined.

For each detected bug, historical code with similar characteristics and bug corrections can be displayed for the code under development. If a computed risk factor for the bug correction meets or exceeds a specified threshold, the bug correction can be automatically applied. Additional testing can be automatically performed on the corrected code.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF DRAWINGS

FIG. 1b is a block diagram illustrating an example of data stored in a historical bug dataset in accordance with aspects of the subject matter disclosed herein;

FIG. 1c is a block diagram illustrating an example of a display 124 of a historical bug and its correction in accordance with aspects of the subject matter disclosed herein;

FIG. 2c illustrates a flow diagram of an example of a method 300 of a data mining engine on an example program.

DETAILED DESCRIPTION

Overview

Figure 1A:
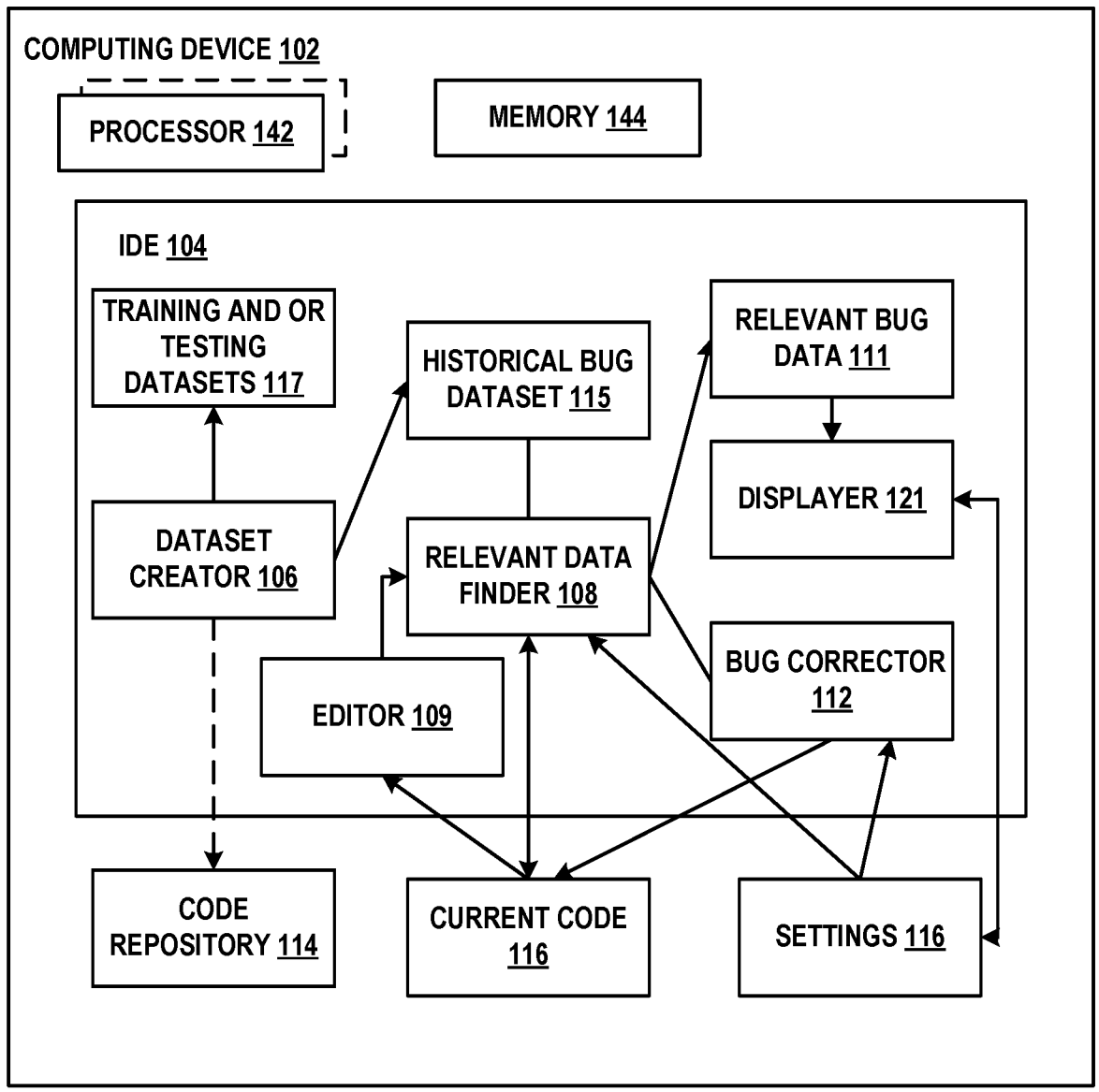
FIG. 1a is a block diagram illustrating an example of a system 100 for facilitating software development using bug data in accordance with aspects of the subject matter disclosed herein.

A dataset of historical bug data can be constructed that can include historical data comprising the original buggy code (i.e., the code before the bug was corrected) and the code after the bug was corrected. An entry into the dataset can be made for each bug and corrected code pair.

The historical bug dataset can be created by retaining training and testing datasets created for a machine learning and/or statistical analysis system that has been trained to distinguish between buggy and bug-free source code by learning the characteristics of buggy code. The historical bug dataset can be created at the same time as the training and testing datasets for a bug prediction machine learning and/or statistical analysis system are created, when all of the relevant information is readily available. The historical bug dataset can be created by processing existing training and testing datasets, by accessing the original source code and finding the original buggy code and the corrected code by iterating over a source code repository until the relevant entries are found.

Code under development (called herein "current code") can be provided for which relevant code in the historical bug dataset can be searched. Current code can be code that has been determined to be buggy. Current code can be code that is assumed to be buggy. Current code can include a mixture of buggy and bug-free code. The original buggy code in the historical bug dataset can be analyzed to detect similarities to the current code. The historical bug dataset can include an internal representation for the original historical buggy code. The internal representation of the current code can be processed to detect similarities with the internal representation of the historical code in the historical code dataset.

Similarity can be measured by counting the number of overlapping elements between the current code and the original buggy code. Elements are aspects of the code that are considered by the processor and can include but are not limited to characters, chunks of characters, space-delimited parts of the code, lines, metrics and/or abstract representations of code such as syntax tokens. Overlapping elements are elements that occur in both the current code and the original buggy code. Similarity can be measured by counting the number of overlapping elements that are in the same position in the current code and the original buggy code.

Source tokens can be compared to determine the degree of similarity. Degree of similarly can be determined by counting the number of overlapping tokens. Overlapping tokens are tokens that exist in both the current code and the historical code. In accordance with some aspects of the subject matter described herein, the position of the overlapping tokens in the code can be considered. A mapping indicating the similarity of different token types can also be constructed which can be factored into the determination of overlap. For instance, it may be decided that if an "IntegerDeclaration" token is almost equivalent to a "UnsignedIntegerDeclaration" token, (where "almost equivalent" is defined by a specified percentage of likeness) so that a match on "IntegerDeclaration" is given almost the same weight or the same weight as a match for "UnsignedIntegerDeclaration".

Metrics can be compared to determine the degree of similarity. The difference (positive or negative) between the different metrics can be determined. An appropriate algorithm such as addition can be applied to the metrics. For example, the number of overlapping tokens can be computed by the adding 1 for each element in an overlapping position. In the example above, an amount less than 1 (e.g., 0.75) can be added for each partial overlap (e.g., use of "UnsignedIntegerDeclaration" instead of "IntegerDeclaration"). In this example, non-overlapping tokens could result in the subtraction of 0.5 from the metric. Many other formulas are also possible including more complicated formulas.

Chunk-by-chunk source code comparison can be used to determine the degree of similarity. A chunk is a string of a specified number of characters. The number of overlapping characters at each position in the string can be counted.

Relevant historical bug data can be displayed. A defined number of lines of code preceding each bug and bug correction pair and/or a defined number of lines following each bug and bug correction pair can be included in the display. The lines preceding and following the buggy line can provide context for the bug.

The degree of similarity between the current code and the historical bug data can be visualized in a display. For example, a pop-up window can be displayed in response to hovering over a line highlighted as potentially buggy in, for example, a source code editor. The display can display information including but not limited to the risk that the current code is buggy, a scrollable list of similar bugs and their fixes, and so on. The difference in the code between the buggy code and the corrected code can be highlighted.

In accordance with some aspects of the subject matter disclosed herein, the correction for the current code can be determined based on historical bug corrections. For example, if the change between the buggy code and the corrected code is identical for all or for at least a specified percentage of identified historical cases (e.g., the bug correction consistently adds an extra variable declaration to a statement), the correction can be provided as an option to correct the current code. The correction can be applied to the current code when the corrected code is selected. The correction can be applied automatically without the developer having to perform any manual operation. The correction can be applied automatically if a specified risk falls below a specified risk threshold. If automatically applied, a notification of the correction can be sent through in-application notifications, emails, instant messages or the like.

The system can record selections made by a user in cases where choices are presented. The recorded data can be used to intelligently suggest corrections in the future. For example, if it is found that given certain code characteristics, users almost always or always selected the second correction from the list, the second correction can be moved to the first position in the list in the future. The recorded data can be used to automatically apply corrections without any manual operation being performed.

In accordance with some aspects of the subject matter disclosed herein, the internal representation of the corrected code can be computed. In accordance with some aspects of the subject matter disclosed herein, if the internal representation of the current code exactly matches the internal representation of the buggy code in the historical bug dataset, the internal representation of the corrected code can be computed. The internal representation of the corrected code can be computed when the computed similarity value reaches or exceeds a specified value. The tokens (or other elements) of the current code can be replaced with the corresponding tokens in the corrected code to correct the current code.

In accordance with some aspects of the subject matter disclosed herein, the result of each bug correction made to the current code can be compiled (e.g., in background) to determine if the compilation is successful. Successful compilation can lower the probability that the code is still buggy. If the compilation is successful the bug correction can be applied to the current code. Static code analysis and other analyses can be performed. Unit tests and other tests can be run. Static code analysis can be run. The correction may not be applied to the current code if the compilation, static code analysis, other analyses and/or tests fail.

If a correction is automatically applied to the current code, the automatic bug correction can be performed as the developer types (e.g., when the cursor position moves to the next position or next line), when the code is saved, when the code is committed to a local source code repository branch, when the code is committed to a local source control repository, when the code is committed to a remote source control repository, asynchronously at any appropriate interval, in accordance with the value of a setting and so on.

If the correction is automatically applied, a notification of the bug correction can be provided to the developer, administrator, manager and/or other appropriate individual or team. Therefore, in case the correction is not correct and its application leads to bugs, the relevant people can be informed so rectification of the errors can occur. Notification can be performed through any mechanism including but not limited to toast notifications, dialog boxes, confirmation prompts, email, social network posts, instant messages, SMS messages and/or telephone calls.

In accordance with aspects of the subject matter described herein, unit tests and/or other testing can be automatically added for identified potential bugs to determine the presence of bugs and assist with bug resolution. The probability of code including bugs can be used to determine when tests should be created. The tests can be generated automatically without user intervention.

It will be appreciated that although described in the context of software bugs, the subject matter disclosed herein is not so limited. The above subject matter also applies to problems with hardware and hardware configuration. Information concerning problems with changes to hardware can be used to determine whether it is safe to make hardware changes. The elements of hardware can be described using a hardware description language (HDL) or the like.

Enhancing Software Development Using Bug Data

FIG. 1a is a block diagram illustrating an example of a system that uses historical bug data to enhance software development in accordance with aspects of the subject matter disclosed herein. All or portions of system 100 may reside on one or more computers or computing devices such as the computers described below with respect to FIG. 3. System 100 or portions thereof may be provided as a stand-alone system or as a plug-in or add-in. System 100 may operate wholly or partially within an integrated development environment (IDE) such as IDE 104 or can execute wholly or partially outside an IDE. An IDE can be an IDE such as described with respect to FIG. 4 or can be any other IDE or development environment.

System 100 or portions thereof may include information obtained from a service (e.g., in the cloud) or may operate in a cloud computing environment. A cloud computing environment can be an environment in which computing services are not owned but are provided on demand. For example, information may reside on multiple devices in a networked cloud and/or data can be stored on multiple devices within the cloud. System 100 can be an on-premises system.

System 100 can include one or more computing devices. Contemplated computing devices include but are not limited to desktop computers, tablet computers, laptop computers, notebook computers, personal digital assistants, smart phones, cellular telephones, mobile telephones, sensors, server computers, client computers and so on. A computing device such as computing device 102 can include one or more processors such as processor 142, etc., and a memory such as memory 144 that communicates with the one or more processors.

System 100 may include one or more program modules that when loaded into the memory and accessed by the one or more processors cause the processor to perform the action or actions attributed to the one or more program modules. The processor(s) may be configured to perform the action or actions attributed to the one or more program modules. System 100 may include any one of or any portion of or any combination of any number of the following: a program module that creates a historical bug dataset such as dataset creator 106, a relevant bug data finder program module such as relevant data finder 108, a program module that displays relevant historical bug data such as displayer 121 and/or a program module that automatically corrects bugs such as bug corrector 112.

A dataset creator 106 can create a historical bug dataset such as historical bug dataset 115. The dataset creator 106 can create a dataset of historical bug dataset 115 that includes historical data about how bugs were fixed previously. The historical bug dataset 115 can include the original buggy code (i.e., the code before the bug was corrected) and the code after the bug was corrected. An entry into the dataset can be made for each buggy code and corrected code pair. The historical bug dataset 115 can include an internal representation of the buggy code. The historical bug dataset 115 can include an internal representation of the corrected code.

FIG. 1b illustrates an example 120 of possible entries into an historical bug dataset. In this example, a first entry 122 comprises an internal representation of the buggy code 122a, the original buggy code 122b, 2 lines of code preceding the buggy code 122d, 2 lines of code following the buggy code 122e, and the corrected code 122c.

A historical bug dataset 115 can be created by retaining training and testing datasets such as training and/or testing datasets 117. Training and/or testing datasets 117 may be training and testing datasets created for a machine learning and/or statistical analysis system that has been trained to distinguish between buggy and bug-free source code by learning the characteristics of buggy code. The historical bug dataset 115 can be created at the same time as the training and testing datasets for a bug prediction machine learning and/or statistical analysis system are created, when all of the relevant information is readily available. The historical bug dataset can be created by processing existing training and testing datasets, by accessing the original source code in the code repository 114 and finding the original buggy code and the corrected code by iterating over the code repository 114 until the relevant entries are found. The code repository 114 may be a version control system such as Apache Subversion or GIT. However, the subject matter disclosed herein is not limited to a code repository and other sources including source code may be utilized as well. For example, without limitation, a data mining engine may search source code files belonging to a particular project in an integrated development environment (IDE), and/or search source code files associated with a particular storage location (e.g., directory, cloud storage, etc.).

Multiple matching entries may be found. Resolution between multiple matching entries can be performed by selecting a match at random and prompting a user to select or reject the match. All the matching entries can be provided for selection or rejection. Multiple matches can be dropped. Resolution between multiple entries can be avoided by processing the data in the same order when creating the testing and training datasets and historical bug dataset.

Settings such as settings 131 can be received that establish thresholds including but not limited to a threshold or series of thresholds for relevance determination, a similarity threshold, the number of lines to display before and after a buggy line of code, Current code such as current code 116 can be code entered into a source program editor such as editor 109 in an IDE such as IDE 104 or other development environment as is known in the art. The current code 116 can include buggy and bug-free code. Buggy code can be determined to be buggy though compiler error generation, by using a bug tracker associated with the code repository 114, by a machine learning and/or statistical analysis system and/or by any other suitable method. Current code may be known to be buggy. Current code can be assumed to be buggy. While typically the subject matter disclosed herein is expected to be applied when code is suspected to be buggy, it will be appreciated that the subject matter is not so limited and can be applied to any code.

The current code 116 can be received by a relevant data finder such as relevant data finder 108. In accordance with some aspects of the subject matter disclosed herein, the current code 116 can be provided to relevant data finder 108 in an internal representation of the code. Other formats are also possible. Relevant data finder 108 can search the historical bug dataset 115 to find relevant bug data such as relevant bug data 111. To find relevant bug data, the buggy code in the historical bug dataset 115 can be analyzed to detect similarities to the current code 116. In accordance with some aspects of the subject matter disclosed herein, historical bug data can be considered relevant when at least a specified threshold of similarity is reached.

As mentioned above, the historical bug dataset 115 can include an internal representation for the code. The internal representation of the current code 116 can be processed to detect similarities with the internal representation of the historical code in the historical bug dataset 115. Similarity can be measured by counting the number of overlapping elements between the current code 115 and the original buggy code in the historical bug dataset 115. Elements are aspects of the code that are considered by the processor and can include but are not limited to characters, chunks of characters, space-delimited parts of the code, lines, metrics and/or abstract representations of code such as syntax tokens. Overlapping elements are elements that occur in both the current code and the original buggy code. Similarity can be measured by counting the number of elements that are in the same position in the current code and the original buggy code.

Techniques such as but not limited to Hamming distance, Levenshtein distance and Damerau-Levenshtein distance, Needleman-Wunsch distance or Sellers' algorithm, Smith-Waterman distance, Gotoh distance or Smith-Waterman-Gotoh distance, Monge Elkan distance, Block distance or L1 distance or City block distance, Jaro-Winkler distance, Soundex distance metric, Simple matching coefficient (SMC), Dice's coefficient, Jaccard similarity or Jaccard coefficient or Tanimoto coefficient, Tversky index, Overlap coefficient, Euclidean distance or L2 distance, Cosine similarity, Variational distance, Hellinger distance or Bhattacharyya distance, Information radius (Jensen-Shannon divergence), Skew divergence, Confusion probability, Tau metric, an approximation of the Kullback-Leibler, divergence, Fellegi and Sunters metric (SFS), Maximal matches, Lee distance and/or various plagiarism detection solutions can be used to detect similarities between the current code and the buggy code in the historical bug dataset.

Sometimes a bug can span several source code lines. Similarity detection can be performed for consecutive lines which may or may not be detected as buggy. When a line of code continues on multiple actual lines, (the line of code includes a line break) the line break can be removed in the system's internal representation. Whitespace and other characters of little or no syntactical importance can be ignored. If no match is found for one line, several consecutive lines in the current code can be matched against consecutive lines in the historical bug dataset 115.

If no similarity is found, the threshold used for relevance determination can be reduced and the search can be performed again. The search can be optimized by searching from a first (lower) threshold. The matches returned can be recorded. The threshold can be increased and the search can be repeated. Increasing the threshold and searching can be repeated until no results are returned. The matches returned from the highest threshold for which results were found can be displayed. For example, suppose relevance is defined as "10% of the current code matches the historical bug data". 10% represents the lower threshold. If multiple matches are found, the threshold can be increased to, for example, 20%. If multiple matches are found with the threshold of 20% the threshold can be increased again to, for example, to 30%. This process can continue until no match is found. The matching historical data for the highest threshold for which at least one match was found can be displayed.

Source tokens can be compared to determine the degree of similarity. Degree of similarly can be determined by counting the number of overlapping tokens. Overlapping tokens are tokens that exist in both the current code and the historical code. In accordance with some aspects of the subject matter described herein, the position of the overlapping tokens in the code can be considered.

Metrics can be compared to determine the degree of similarity. The difference (positive or negative) between the different metrics can be determined. An appropriate algorithm such as addition can be applied to the metrics. For example, the number of overlapping tokens can be computed by adding 1 for each element in an overlapping position. In the example above, an amount less than 1 (e.g., 0.75) can be added for each partial overlap (e.g., use of "UnsignedIntegerDeclaration" instead of "IntegerDeclaration"). Non-overlapping tokens could result in the subtraction of some amount (e.g., 0.5) from the metric. Many other formulas are also possible including more complicated formulas.

Chunk-by-chunk source code comparison can be used to determine the degree of similarity. A chunk is a string of a specified number of characters. The number of overlapping characters at each position in the string can be counted.

The historical bug data can be visualized through a development environment such as but not limited to an IDE. A degree of similarity between the current code and the historical bug data can be displayed. Data can be displayed (e.g., in a source code editor) by a displayer such as displayer 121. The historical bug data can include some number of lines preceding and following the buggy line. A defined number of lines of code preceding each bug and bug correction pair and/or a defined number of lines following each bug and bug correction pair can be displayed. These lines of code can provide context for the bug. The number of lines of context code included can be fixed. The number of lines of context code can be determined by the size of the bug and bug correction pair. The context code can be included for both the bug line and the corrected line. The context information can be included for one of the bug pair and excluded from the other of the pair, (as illustrated in FIG. 1c) if the context information is the same for both members of the pair.

In accordance with some aspects of the subject matter disclosed herein, when there are multiple buggy lines of code, the number of consecutive lines used for matching against historical data can be increased. Typically, all the buggy lines of code are likely to be related to a single issue.

Figure 1D:
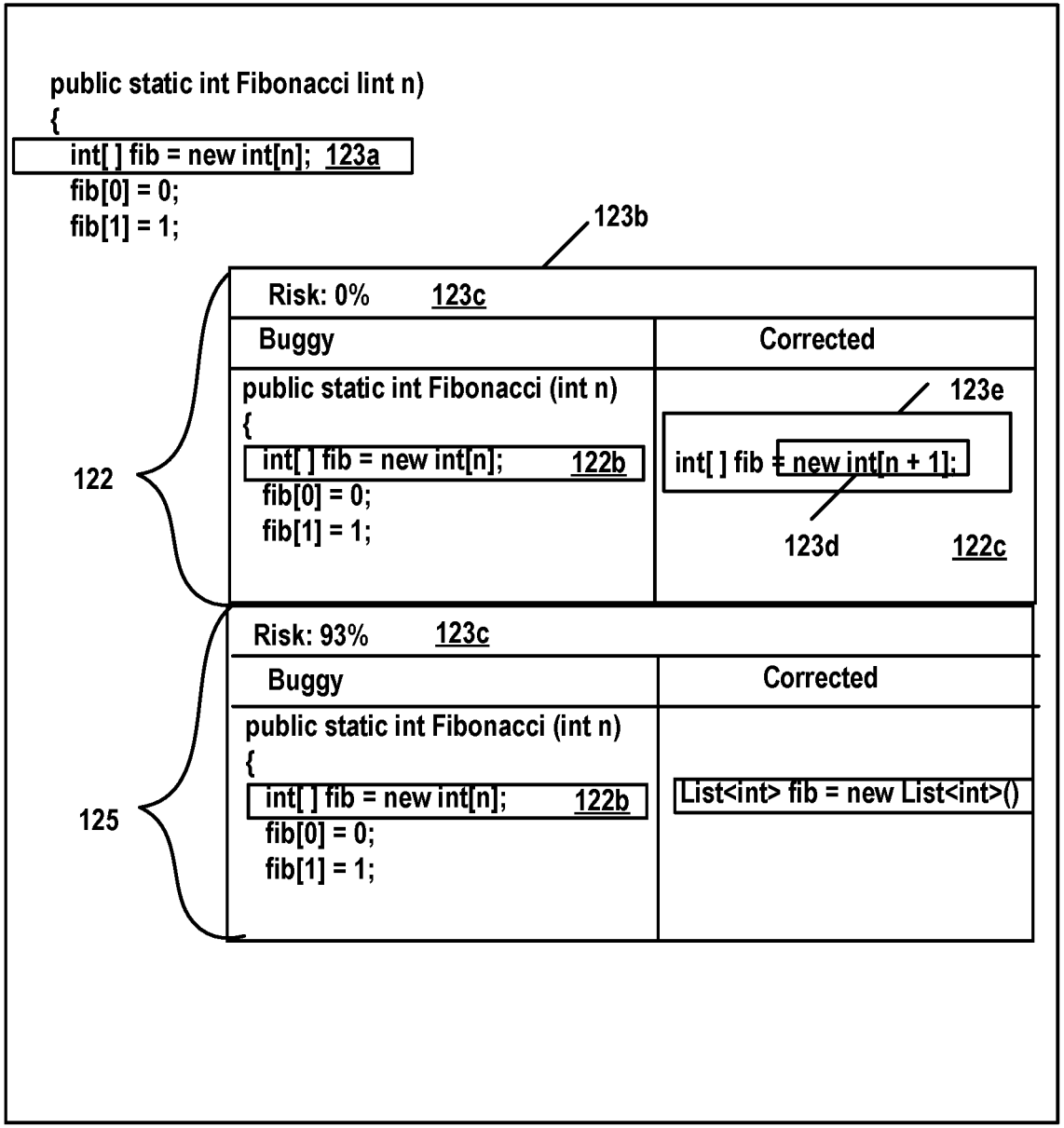
FIG. 1d is a block diagram illustrating an example of a display 126 of possible corrections for a bug in accordance with aspects of the subject matter disclosed herein.

In accordance with some aspects of the subject matter disclosed herein, a pop-up window can be displayed in response to hovering over a line (e.g., in a source code editor) highlighted as potentially buggy. FIG. 1c illustrates an example 124 of such a display of the historical bug data of FIG. 1b and current code 116 in an editor 109. Current code 116 includes buggy code 123a. Relevant code finder 108 can search the historical bug dataset 115. Suppose relevant code finder finds relevant code such as the first entry 122 (122a-122e) in FIG. 1b. The buggy code 122b and the corrected code 122c from the historical bug dataset 115 can be displayed in a pop-up window such as pop-up window 123b of FIG. 1c. The pop-up window 123b can display the buggy code 122b and the corrected code 122c from historical bug dataset 115. A risk value can be displayed. In FIG. 1c because the buggy current code 123a is identical to the historical buggy code 122b, the risk 123c is 0%. The whole line or only the corrected element can be highlighted. In FIG. 1c only the difference between the corrected code 123e and the buggy code 122b is highlighted as indicated by the box 123e surrounding the corrected highlighted element 123d. A scrollable list of similar bugs can be provided including their corrections as shown in FIG. 1d, and so on. The display can be sorted by a relevance score. A relevance score can reflect the degree to which the current code matches the historical code. FIG. 1d illustrates an example of a display 126 having a scroll list of two possible bug correction entries, entry 1 122 and entry 2 125.

In accordance with some aspects of the subject matter disclosed herein, potentially buggy code with a level of test coverage that exceeds a specified value can remain un-highlighted. Potentially buggy code with a level of test coverage that exceeds a specified value can be highlighted differently than code that does not have a level of test coverage that meets the threshold. For example, the intensity of highlighting can be reduced by an amount equal to the percentage of test coverage.

Selection of a displayed bug correction can cause the selected bug correction to be applied to current code 116. For example, in FIG. 1d, selection of entry 1 122 can cause bug corrector 112 to replace the buggy code 123a with the corrected code 123e. A bug corrector 112 may automatically correct current code. For example, if the change between the buggy code and the corrected code is identical for all relevant code or for less than a specified threshold of identified historical cases, the fix can be provided as an option to correct the current code. A bug corrector 112 may automatically correct current code without the developer having to perform any manual operation. If automatically applied, the developer, administrator, manager and/or other appropriate individual or team etc. can be informed of the correction through in-application notifications, emails, instant messages or the like.

If the internal representation of the current code 116 exactly matches the internal representation of the buggy code in the historical bug dataset, the internal representation of the corrected code can be computed or retrieved from the dataset if present. In the internal representation of the current code, the tokens (or other elements) can be replaced with the source code elements corresponding to each token in the corrected code. The correction can be applied. A representation that does not necessarily correspond to the original internal representation can be computed. For example, if using a representation involving character-by-character comparison is useful for determining matches but using a syntax token representation is more useful for computing corrections, the syntax token representation can be computed. None, some, or many possible representations can be stored within the dataset.

In accordance with some aspects of the subject matter disclosed herein, the result of each fix can be compiled (e.g., in background) to determine if the compilation is successful. Successful compilation can lower the probability that the code is still buggy. If the compilation is successful the bug correction can be applied to the current code. Static code analysis and other analyses can be performed. Unit tests can be run. Successful test results can lower the probability that the code is still buggy.

If a bug correction is automatically applied to the current code, the automatic bug correction can be performed as the developer types (e.g., when the cursor position moves to the next position or next line), when the code is saved, when the code is committed to a local source code repository branch, when the code is committed to a local source control repository, when the code is committed to a remote source control repository, asynchronously at any appropriate interval, in accordance with the value of a setting and so on.

If the correction is automatically applied, a notification of the correction can be provided to the developer, administrator, manager and/or other appropriate individual or team. Therefore, in case the correction is not correct and its application leads to bugs, the relevant people are kept informed so as to facilitate rectification of the errors. Notification can be performed through any mechanism including but not limited to toast notifications, dialog boxes, confirmation prompts, email, social network posts, instant messages, SMS messages and/or telephone calls.

In accordance with aspects of the subject matter described herein, unit tests and/or other testing can be automatically added for identified potential bugs to determine the presence of bugs and assist with bug resolution. The probability of code including bugs can be used to determine when tests should be created. The tests can be generated automatically without user intervention. In accordance with some aspects of the subject matter described herein, test stubs (declarations without logic) can be created. Creation of test stubs can be useful when automatic testing is not feasible. Creation of test stubs can ensure active developer involvement. Implementations can be included within the test stubs, using the methodologies described above for test generation. In accordance with some aspects, only the input statement is included and all other operations such as output validation can be excluded. Tests can be run in code coverage mode. The number of code paths covered by testing can be recorded. Using test coverage information such as but not limited to the code coverage information described above, the risk factor can be modified in accordance with the level of test coverage. In accordance with some aspects of the subject matter disclosed herein, the risk factor can be reduced numerically in proportion to the degree of test coverage. The degree of reduction of the risk factor can be a numerical reduction to the computed percentage, reduced by a constant value selected in accordance with an analysis or in accordance with a setting.

The reduction value can be computed in accordance with the number of tests covering the risky code. A successful first test may reduce the risk factor by a greater amount than subsequent tests.

The automatically added tests can be unit tests. Unit tests are small, short tests used to test "units" of functionality. By verifying each small unit, the overall functionality of the software can be verified. Higher level testing can be automatically generated. Higher level testing tests composed units of functionality. For example, integration tests are used to ensure that the integrated components work correctly. Any known style of testing at any level can be automatically added. Unit tests can be added for each code path through the potentially risky code.

Known methodologies for automatically generating unit tests typically generate a subset of all possible inputs that result in all code paths being executed. Many methodologies cannot verify that the result is correct, as this information is normally not provided in any computer-readable form, therefore necessitating the need for a human to check the tests afterwards. In accordance with aspects of the subject matter disclosed herein, human oversight can be enforced by a default setting of "fail" that has to be overridden by human action or by ensuring the tests fail to compile until the developer acts. Similar methodologies can be used for higher-level tests.

In accordance with some aspects of the subject matter disclosed herein, tests can be automatically generated when: the risky code is introduced, saved, committed to a local source code repository branch, committed to a local source-control system repository, committed to a remote source-control system repository, asynchronously at any appropriate interval, in accordance with the value of a setting and so on.

In response to the automatic generation of tests, a notification can be sent to a developer, administrator, manager and/or other appropriate individual or team through any mechanism including but not limited to toast notifications, dialog boxes, confirmation prompts, email, social network posts, instant messages, SMS messages or telephone calls.

Figure 2A:
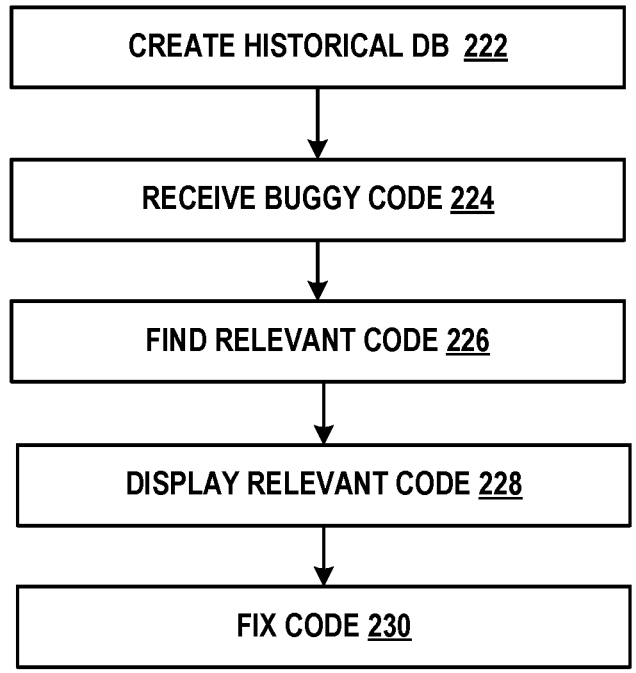
FIG. 2a is a flow diagram of an example of a method 220 for facilitating software development using bug data in accordance with aspects of the subject matter disclosed herein.

FIG. 2a is a flow diagram of an example of a method 220 for facilitating software development using bug data in accordance with aspects of the subject matter disclosed herein. The method described in FIG. 2a can be practiced by a system such as but not limited to the one described with respect to FIG. 1a. While method 220 describes a series of operations that are performed in a sequence, it is to be understood that method 220 is not limited by the order of the sequence depicted. For instance, some operations may occur in a different order than that described. In addition, one operation may occur concurrently with another operation. In some instances, not all operations described are performed. In some instances, not all operations performed are illustrated.

At operation 222 a historical bug dataset can be created as described more fully above. At operation 224 buggy code can be received. At operation 226 the historical bug dataset can be accessed to find relevant historical bug data. At operation 228 historical bug data can be displayed. At operation 230 the buggy code can be corrected. Method 220 is described more fully above with respect to FIG. 1a.

Figure 2B:
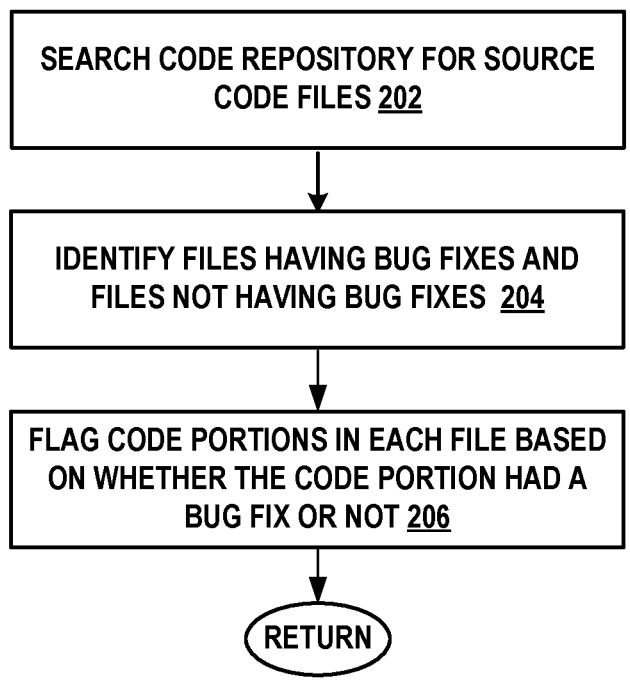
FIG. 2b illustrates a flow diagram of an example of a method 200 of a data mining engine.

FIG. 2b illustrates a flow diagram of an example of a method 200 for generating a historical bug dataset. Referring to FIG. 2b, a data mining engine can search a source code repository for source code files with and without software bugs (block 202). The source code repository may be a version control system such as Apache Subversion or GIT. However, the subject matter disclosed herein is not limited to a source code repository and other sources containing source code may be utilized as well. For example, without limitation, the data mining engine 106 may search source code files belonging to a particular project in an integrated development environment (IDE), and/or search source code files associated with a particular storage location (e.g., directory, cloud storage, etc.).

In accordance with aspects of the subject matter disclosed herein, a data mining engine can search a version control repository. The version control system may track changes made to a source code file in a change history or in metadata that is recorded in the repository. Alternatively, the data mining engine may collect all the data in a source code file regardless of any modifications made to the source code file to fix a bug. Furthermore, if the history of changes made to the source code file was voluminous, recent changes may be selected in order to reduce the analysis time. If major changes were made to the source code file, only changes made subsequent to the major changes can be considered.

The change history may indicate that the source code file was changed due to a bug correction. The data mining engine can search the change history for those source code files having changes made due to a bug correction. The change history may indicate in which source code statement the bug is located. Based on this search, the data mining engine can choose different source code files in which a change was made for a bug correction and those not having software bugs (block 204). The data mining engine can tag each line of a source code file with a flag that identifies whether the line of source code includes a bug or not (block 206). These annotated programs can then be input to a code analysis engine.

FIG. 2c illustrates an example of operations 300 of the data mining engine with respect to a source code file. Turning to FIG. 2c, there is shown a portion of an original source code file 302 written in C# having 14 lines of code or source code statements. For the purposes of this example, a source code statement is identified as being a continuous sequence of code elements that ends at a semicolon. The original source code file 302 may be stored in a source code repository. The original source code file 302 may have been checked out of the source code repository. The original source code file 304 shows a modified version of the original source code file 302 which corrects two software bugs at line 5 and 10.

The source code repository may track these changes and attribute them to bug corrections. Differential code 306 illustrates the differences between the original source code file 302 and the modified source code file 304 where the source code statement "int[] fib=new int[n]" is annotated with the "−" symbol indicating that the associated code statement was altered. In addition, program 306 shows the source code statement "int [ ] fib=new int [n+1]" annotated with a "+" symbol indicating that the associated code statement is the modification. The data mining engine reads the tracked changes of a source code file (i.e., change sets) and annotates the source code file with a flag that indicates whether or not each source code statement contains a bug. Mined data 308 represents the original source code file 302 annotated with a flag at each line, where the flag "FALSE" denotes that there is no bug in a source code statement and the flag "TRUE" denotes a software bug is in the source code statement. This mined data 308 is then input to the code analysis engine.

Figure 2D:
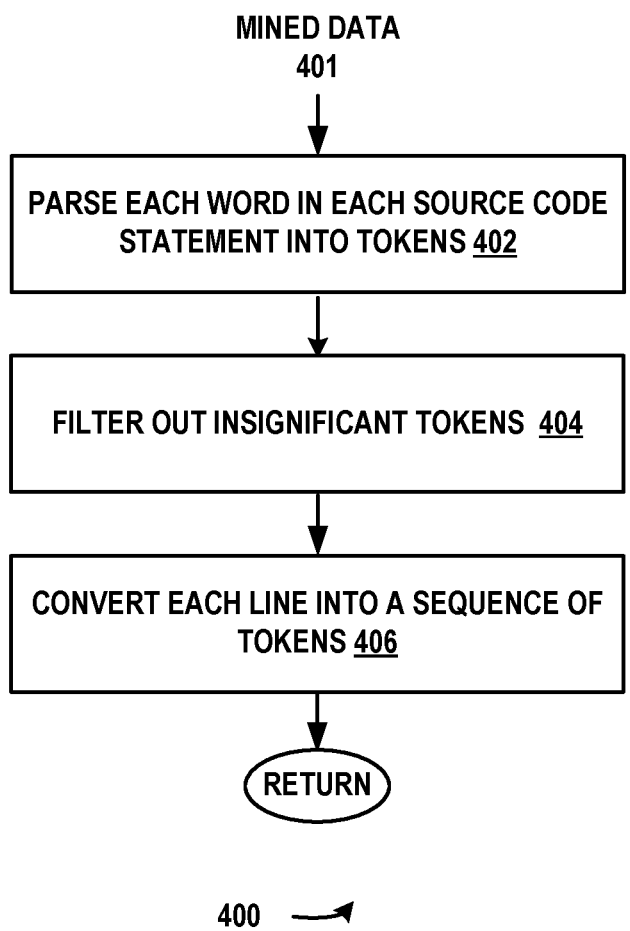
FIG. 2d illustrates an example of a method 400 of a code analysis engine during the training phase.

FIG. 2d illustrates a flow diagram of an example of a method 400 of the code analysis engine 110 during a training phase. The code analysis engine 110 can analyze the mined data 401 to reduce the code input to its essential elements and to identify more relevant data. The analysis can proceed by parsing each source code statement using the grammar of the programming language of the source code file into tokens (block 402). A token is a lexical atom and the smallest element in the grammar of the source code program's programming language. For example, for a source code statement written in C# that reads "result=input1+input2", this source code statement would be parsed into a sequence of tokens as follows: "Variable/Assignment Operator/Variable/Addition Operation/Variable/EndofLine."The element "result" is represented by the token "Variable", element "=" is represented by the token "Assignment Operator", the element "input1" is represented by the token "Variable", the element "+" is represented by the token "Addition Operation", the element "input2" is represented by the token "Variable", and the token "EndofLine" or "EOL" represents the end of a source code statement.

The code analysis engine can optionally filter out certain tokens deemed to be insignificant, such as comments, whitespace, etc., and code changes that are not of interest (block 404). Each element in a line can be replaced with a corresponding token thereby transforming the source code statement into a sequence of tokens where each token corresponds to an element in the original source code statement (block 406).

Conclusion

Described herein is a system that includes a memory, a processor connected to the memory, where the processor is configured to receive current code, find historical code relevant to the current code in a historical bug dataset and display the relevant historical code in a software development environment. A historical bug dataset can be created using training dataset for a machine learning model. Bugs can be corrected automatically. The historical bug dataset can include an internal representation of the original buggy code. A degree of similarity between an internal representation of the relevant historical code and an internal representation of the current code can be calculated by counting the number of overlapping tokens in the internal representation of the relevant historical code and the internal representation of the current code. Similarities can be detected between an internal representation of the relevant historical code and an internal representation of the current code by comparing metrics of the buggy code and the current code to determine overlap.

Described herein is a method in which current code comprising buggy code is received by a processor and historical bug data relevant to the buggy code is found in a historical bug dataset. The code can be determined to be buggy using a machine learning system. Existing buggy code in a historical bug dataset can be analyzed to detect similarities to the current code using an internal representation of the historical bug data relevant to the buggy code in the historical bug dataset and an internal representation of the current code. Similarity can be measured by counting overlapping elements between the current code and the buggy code in the historical bug dataset. Similarity can be measured by counting elements that are in the same position in the current code and the original buggy code. Similarity can be measured by comparing tokens. Similarity can be measured by comparing metrics. Similarity can be measured by comparing chunks of code.

Described herein is a device comprising a memory, a processor connected to the memory, the processor receiving buggy code, finding historical code relevant to the buggy code in a historical bug dataset and displaying relevant historical code in a development environment. The processor can be configured to automatically correct code bugs based on finding historical bug information similar to buggy code. The processor can automatically add additional testing in the editor. The processor can automatically add additional unit testing in the editor. The processor can automatically compile the corrected code in the editor.

Exemplary Operating Environment

Figure 3:
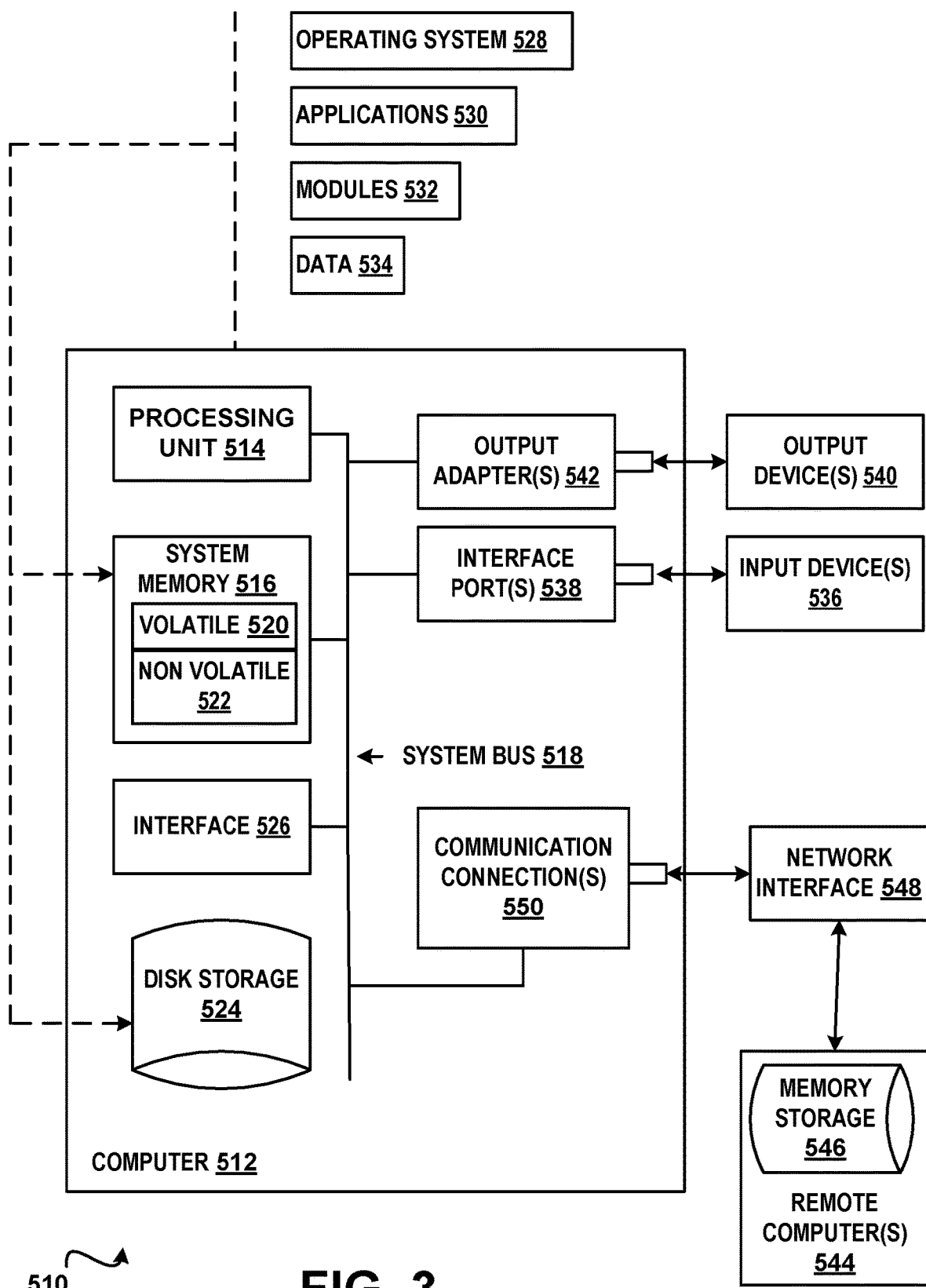
FIG. 3 is a block diagram of an example of a computing environment in accordance with aspects of the subject matter described herein.

In order to provide context for various aspects of the subject matter disclosed herein, FIG. 3 and the following discussion are intended to provide a brief general description of a suitable computing environment 510 in which various embodiments of the subject matter disclosed herein may be implemented. While the subject matter disclosed herein is described in the general context of computer-binary instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 3, a computing device in the form of a computer 512 is described. Computer 512 may include at least one processing unit 514, a system memory 516, and a system bus 518. The at least one processing unit 514 can execute instructions that are stored in a memory such as but not limited to system memory 516. The processing unit 514 can be any of various available processors. For example, the processing unit 514 can be a graphics processing unit (GPU). The instructions can be instructions for implementing functionality carried out by one or more components or modules discussed above or instructions for implementing one or more of the methods described above.

Dual microprocessors and other multiprocessor architectures also can be employed as the processing unit 514. The computer 512 may be used in a system that supports rendering graphics on a display screen. In another example, at least a portion of the computing device can be used in a system that comprises a graphical processing unit. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures. Computer 512 may include a data store accessible by the processing unit 514 by way of the system bus 518. The data store may include binary instructions, 3D models, materials, textures and so on for graphics rendering.

Computer 512 typically includes a variety of computer readable media such as volatile and nonvolatile media, removable and non-removable media. Computer readable media may be implemented in any method or technology for storage of information such as computer readable instructions, data structures, program modules or other data. Computer readable media include computer-readable storage media (also referred to as computer storage media) and communications media. Computer storage media includes physical (tangible) media, such as but not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices that can store the desired data and which can be accessed by computer 512. Communications media include media such as, but not limited to, communications signals, modulated carrier waves or any other intangible media which can be used to communicate the desired information and which can be accessed by computer 512.

It will be appreciated that FIG. 3 describes software that can act as an intermediary between users and computer resources. This software may include an operating system 528 which can be stored on disk storage 524, and which can allocate resources of the computer 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, voice recognition and gesture recognition systems and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 3. Remote computer(s) 544 can be logically connected via communication connection(s) 550. Network interface 548 encompasses communication networks such as local area networks (LANs) and wide area networks (WANs) but may also include other networks. Communication connection(s) 550 refers to the hardware/software employed to connect the network interface 548 to the bus 518. Communication connection(s) 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein may pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

Figure 4:
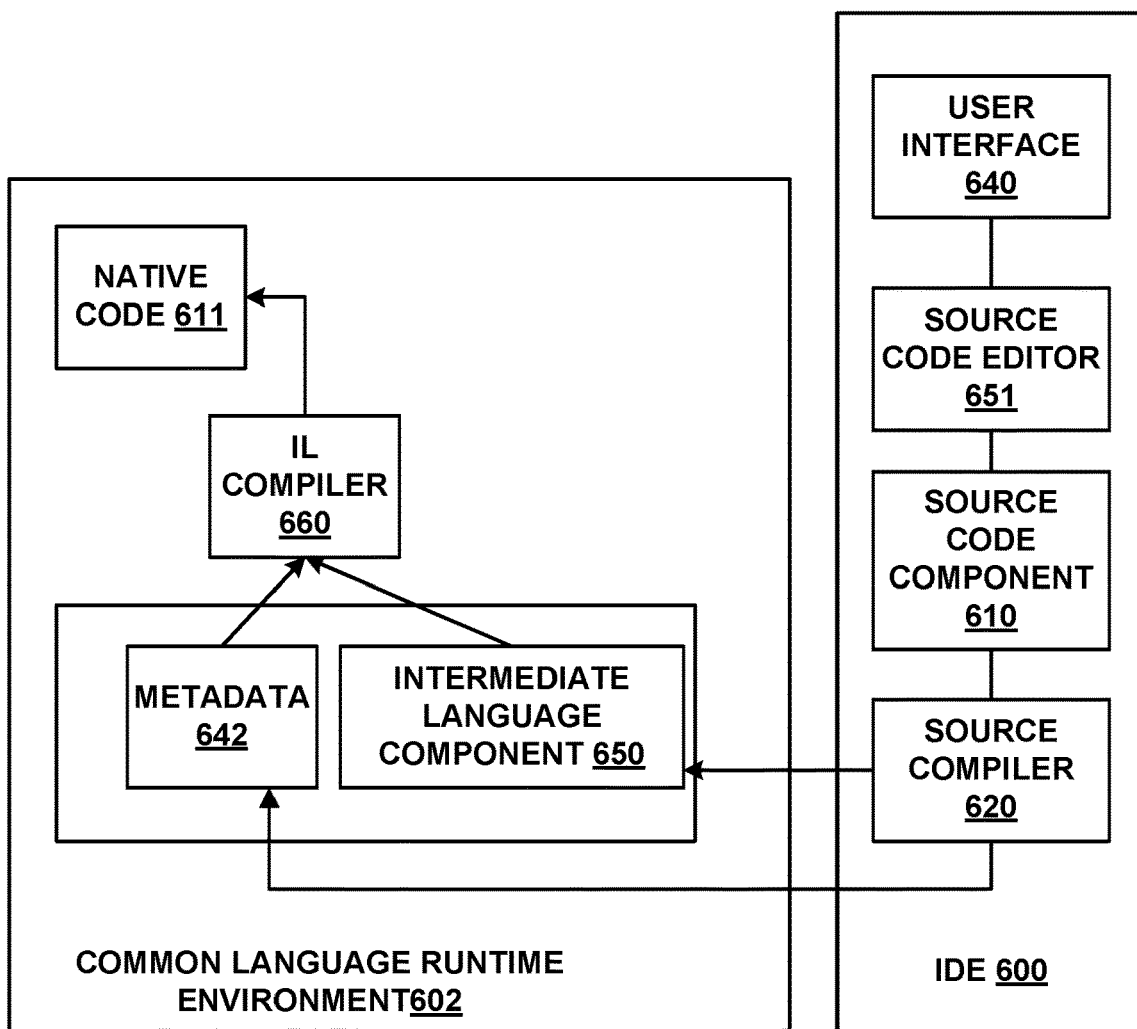
FIG. 4 is a block diagram of an example of an integrated development environment in accordance with aspects of the subject matter described herein.

FIG. 4 illustrates an integrated development environment (IDE) 600 and Common Language Runtime Environment 602. An IDE 600 may allow a user (e.g., developer, programmer, designer, coder, etc.) to design, code, compile, test, run, edit, debug or build a program, set of programs, web sites, web applications, and web services in a computer system. Software programs can include source code (component 610), created in one or more source code languages (e.g., Visual Basic, Visual J#, C++. C#, J#, Java Script, APL, COBOL, Pascal, Eiffel, Haskell, ML, Oberon, Perl, Python, Scheme, Smalltalk and the like). The IDE 600 may provide a native code development environment or may provide a managed code development that runs on a virtual machine or may provide a combination thereof. The IDE 600 may provide a managed code development environment using the .NET framework. An intermediate language component 650 may be created from the source code component 610 and the native code component 611 using a language specific source compiler 620 and the native code component 611 (e.g., machine binary instructions) is created from the intermediate language component 650 using the intermediate language compiler 660 (e.g. just-in-time (JIT) compiler), when the application is executed. That is, when an IL application is executed, it is compiled while being executed into the appropriate machine language for the platform it is being executed on, thereby making code portable across several platforms. Alternatively, in other embodiments, programs may be compiled to native code machine language (not shown) appropriate for its intended platform. A user can create and/or edit the source code component according to known software programming techniques and the specific logical and syntactical rules associated with a particular source language via a user interface 640 and a source code editor 651 in the IDE 600. Thereafter, the source code component 610 can be compiled via a source compiler 620, whereby an intermediate language representation of the program may be created, such as assembly 630. The assembly 630 may comprise the intermediate language component 650 and metadata 642. Application designs may be able to be validated before deployment.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. As used herein, the term "machine-readable medium" shall be taken to exclude any mechanism that provides (i.e., stores and/or transmits) any form of propagated signals. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A system, comprising:
   a memory;
   a processor connected to the memory, the processor configured to:
   receive current code, the current code comprising buggy code;
   find historical code comprising correct code relevant to the current code in a historical bug dataset comprising original buggy code and corresponding correct code, the historical code created by retaining training and testing datasets created for a machine learning system trained to distinguish between buggy and bug-free source code by learning the characteristics of buggy code;

display pairs of original buggy code and corresponding correct code and a degree of risk value of replacing the original buggy code with the corresponding correct code for each pair in a software development environment; and when the risk value is less than a threshold amount, automatically correct the buggy code by replacing the buggy code with the corresponding correct code.

2. The system of claim 1, wherein the historical bug dataset comprises:

an internal representation of the original buggy code.

3. The system of claim 1, the processor further configured to:

calculate a degree of similarity between an internal representation of the relevant historical code and an internal representation of the current code by counting the number of overlapping tokens in the internal representation of the relevant historical code and the internal representation of the current code.

4. The system of claim 1, the processor further configured to:

detect similarities between an internal representation of the relevant historical code and an internal representation of the current code by comparing metrics of the buggy code and the current code to determine overlap.

5. A method comprising:

receiving by a processor:

current code comprising buggy code;

finding historical bug data comprising correct code relevant to the buggy code in a historical bug dataset comprising original buggy code and corresponding correct code, the historical code created by retaining training and testing datasets created for a machine learning system trained to distinguish between buggy and bug-free source code by learning the characteristics of buggy code;

displaying pairs of original buggy code and corresponding correct code and a degree of risk value of replacing the original buggy code with the corresponding correct code for each pair in a software development environment; and when the risk value is less than a threshold amount, automatically correcting the buggy code by replacing the buggy code with the corresponding correct code.

6. The method of claim 5, further comprising:

determining that code is buggy using a machine learning system.

7. The method of claim 5, wherein existing buggy code in a historical bug dataset is analyzed to detect similarities to the current code using an internal representation of the historical bug data relevant to the buggy code in the historical bug dataset and an internal representation of the current code.

8. The method of claim 5, wherein similarity is measured by counting overlapping elements between the current code and the buggy code in the historical bug dataset.

9. The method of claim 5, wherein similarity is measured by counting elements that are in the same position in the current code and the original buggy code.

10. The method of claim 5, wherein similarity is measured by comparing tokens.

11. The method of claim 5, wherein similarity is measured by comparing metrics.

12. The method of claim 5, wherein similarity is measured by comparing chunks of code.

13. The device of claim 12, wherein the processor is further configured to:

automatically add additional testing in the editor.

14. The device of claim 12, wherein the processor is further configured to:

automatically add additional unit testing in the editor.

15. The device of claim 14, wherein the processor is further configured to:

automatically compile the corrected code in the editor.

16. A device comprising:

a memory;

a processor, the processor configured to:

receive buggy code;

find historical code comprising correct code relevant to the buggy code in a historical bug dataset comprising original buggy code and corresponding correct code, the historical code created by retaining training and testing datasets created for a machine learning system trained to distinguish between buggy and bug-free source code by learning the characteristics of buggy code;

display pairs of original buggy code and corresponding correct code and a degree of risk value of replacing the original buggy code with the corresponding correct code for each pair in a software development environment; and when the risk value is less than a threshold amount, automatically correct the buggy code by replacing the buggy code with the corresponding correct code.

17. The device of claim 16, wherein the processor is further configured to:

automatically correct code bugs based on finding historical bug information similar to buggy code.

* * * * *